(12) United States Patent
Carman

(10) Patent No.: US 6,230,435 B1
(45) Date of Patent: May 15, 2001

(54) TREE TRUNK BARRIER FOR PEST CONTROL

(75) Inventor: Glenn E. Carman, Albany, OR (US)

(73) Assignee: Philipp and Doris Washburn, Trustees of the Washburn Family Trust, Riverside, CA (US)

( * ) Notice: Subject to any disclaimer, the term of this patent is extended or adjusted under 35 U.S.C. 154(b) by 0 days.

(21) Appl. No.: 09/178,626

(22) Filed: Oct. 26, 1998

(51) Int. Cl.$^7$ ................................................ A01M 1/18
(52) U.S. Cl. ................................................................ 43/108
(58) Field of Search .............................. 43/108; 47/23, 47/24; 119/61; 52/101

(56) References Cited

U.S. PATENT DOCUMENTS

| | | | |
|---|---|---|---|
| 49,440 | * | 8/1865 | Sanford ................................. 43/108 |
| 176,468 | * | 4/1876 | Grader ................................... 43/108 |
| 691,546 | * | 1/1902 | Hubbell ................................. 43/108 |
| 983,114 | * | 1/1911 | Barry ..................................... 43/108 |
| 1,415,134 | * | 5/1922 | Williams ............................... 43/108 |
| 1,987,394 | * | 1/1935 | Emerson . | |
| 2,011,405 | * | 8/1935 | Giliasso ................................. 43/108 |
| 2,240,766 | * | 5/1941 | Elder . | |
| 2,253,541 | * | 8/1941 | Torbett . | |
| 2,261,360 | * | 11/1941 | Gerendas . | |
| 2,746,201 | * | 5/1956 | Warrell . | |
| 4,098,018 | * | 7/1978 | Bartelme ................................ 43/108 |
| 4,217,722 | | 8/1980 | McMullen . | |
| 4,561,941 | | 12/1985 | Dinnage et al. ...................... 203/24 |
| 4,581,845 | | 4/1986 | Burkholder et al. ................. 43/107 |
| 4,800,676 | * | 1/1989 | Lockwood, Sr. ...................... 43/108 |
| 4,863,718 | | 9/1989 | Bernardo .............................. 424/40 |
| 4,866,877 | | 9/1989 | Barak .................................... 43/121 |
| 5,175,959 | | 1/1993 | Scholnick et al. .................... 43/124 |
| 5,353,556 | | 10/1994 | Hand et al. ........................... 52/101 |

OTHER PUBLICATIONS

"Subtropical Fruit Pests", Walter Ebeling, University of California, Division of Agricultural Sciences, 1959, pp. 121–122.
"The Pest Control Circular", Sunkist Growers, Inc., No. 546, Jun. 1987.
"The Pest Control Circular", Sunkist Growers, Inc., No. 545, Jun. 1986.
"The Citrus Industry", Crop Protection, C.P. Clausen, vol. IV, University of California, Division of Agricultural Sciences, 1978, pp. 276 and pp. 316.
"Insect of Citrus and Other Subtropical Fruits", Henry J. Quayle, 1938, pp. 247–250 and 200–202.
"The Detection and Control of Gypsy Moth (*Lymantria dispar*) Using Pheromone Attractant", Roberta Tolan, pp. 1–7.
"The Gypsy Moth", John M. Corliss, Yearbook of Agriculture, 1952, pp. 694–698.

* cited by examiner

Primary Examiner—Charles T. Jordan
Assistant Examiner—Francis T. Palo
(74) Attorney, Agent, or Firm—Laura A. Donnelly; Piper, Marbury Rudnick & Wolfe LLP

(57) ABSTRACT

An apparatus and method for controlling tree pests are disclosed. The apparatus includes a band of compressible material and a barrier ring. The barrier ring is wrapped around the band of compressible material, which, in turn, is wrapped around the trunk of a tree. The barrier ring contains a recess that is filled with a substance that prevents the progression of pests onto upper levels of the tree. The method involves installing the apparatus of the invention onto the trunk of a tree.

34 Claims, 6 Drawing Sheets

TREE TRUNK BARRIER FOR PEST CONTROL

FIELD OF THE INVENTION

The present invention generally relates to an apparatus and method for controlling tree pests, and, in particular, to an apparatus and method for controlling non-flying tree pests.

BACKGROUND OF THE INVENTION

Since its introduction into this country, the gypsy moth has been recognized as a serious pest on a number of forest and ornamental trees. The damage is inflicted by extensive feeding of the larval stages on tree foliage. Mature larvae drop to the ground to pupate, and the emerging adult females, which are unable to fly, deposit eggs on suitable surfaces near the emergence site. The eggs hatch in the mid to late spring and the newly hatched larvae move up the tree trunk to reach the tree canopy and feed. Corliss, John M., "The Gypsy Moth" Yearbook of Agriculture, 1952, and Tolan, Roberta, "The Detection and Control of Gypsy Moth (*Lamantria dispar*) Using Pheromone Attractant," Insect Behavior (EN 507), Colorado State University, 1995, discuss the effects of defoliation by the gypsy moth.

In addition to the gypsy moth, there exists numerous other tree pests that feed on tree foliage. Such pests include those that cannot fly and therefore can only reach the foliage areas by crawling up the trunk of trees with no other ground contact. The problems associated with these tree pests are well known. For example, Quayle, Henry J., "Insects of Citrus and Other Subtropical Fruits," 1938, discusses the effects of species such as the Argentine ant, the fire ant, and the Fuller rose beetle on trees, and in particular, on citrus trees. Quayle discloses, in particular, that injury caused by the Fuller rose beetle is characterized by the irregular areas eaten away around the margins of the leaf, and that young and recently budded trees are most effected.

Reuther et al., "Biological Control of Citrus Insects," The Citrus Industry", Vol. 4, 1978, also discloses the harmful effects resulting from ant infestations in citrus orchards. In particular, the Reuther reference discloses that the ants bring about increases in the infestations of many damaging species such as scale insects and mealy bugs. Ebeling, Walter, "Subtropical Fruit Pests," Biological Control, 1959, supports Reuther et al. in disclosing that the presence of ants, which are attracted to trees in which the sugary excrement (honey dew) of insects such as the aphids, mealy bugs, unarmored scales, cottony-cushion scale, and white flies, are present, in citrus orchards has long been known to be undesirable because of their ability to decrease the effectiveness of the natural enemies of the crop pests.

Carman, Glenn E., "The Pest Control Circular," Sunkist Growers, Inc., Nos. 545 (1986) and 546 (1987), discloses the impact of the Fuller rose beetle on exporting citrus to Japan.

For years, various apparatus and methods have been proposed, or used, but with little or no success. For instance, a band of a sticky substance or other deterrent applied directly on the surface of the tree trunk has been used. However, environmental factors such as rainfall, irrigation waters, dust, leaves, others tree parts and other debris have soon rendered such bands ineffective.

Quayle, in particular, discloses the use of tree barriers such as cotton and tanglefoot bands to control a particular species, i.e., the Argentine ant, in citrus orchards. As discussed herein, such devices are subject to environmental influences. Quayle also discloses the use of poisoned baits placed in containers such as paper cups, spice tins and the like and attached to tree trunks. However, as discussed herein, the use of poison to control such pests is highly undesirable.

Carman discloses treatments including foliar applications, skirt pruning with trunk application of chemicals and skirt pruning with trunk barriers such as discussed above to control a number of pests, including snails, ants and Fuller rose beetle. Carman discloses, in particular, the application of highly viscous materials, for example, those that contain polybutene or other hydrocarbon materials, to trunk surfaces. Carman discloses, however, that such methods have disadvantages. For example, Carman discloses that skirt pruning alone is insufficient to control pests and that chemical treatment, although effective, has drawbacks. Carman also discloses that the use of viscous materials on the trunk of a tree may cause bark damage or girdling if applied directly or even if applied on a porous material.

U.S. Pat. No. 5,561,941 discloses the use of a strip of material that contains a coating having specified properties to restrict the movement of insects up the trunk of a tree. As discussed herein, the use of such a device is subject to environmental influences.

U.S. Pat. No. 4,098,018 discloses an insect trap that is attachable to a tree. The trap contains a canister attached thereto to deliver an insecticide. As discussed herein, the use of such substances is undesirable.

U.S. Pat. No. 5,353,556 discloses a device for preventing pests from crawling up the trunk of a tree. The device, which involves positioning a combination of tactic, ultraviolet light and other barriers in the path of the pest, would require special molding and therefore would not be cost effective.

Accordingly, there remains a need for better apparatus and methods that are capable of controlling tree pests.

SUMMARY OF THE INVENTION

It is an object of the present invention to provide an apparatus and method for controlling tree pests.

It is another object of the present invention to provide an apparatus and method for controlling tree pests that are more effective than conventional apparatus and methods.

It is yet another object of the present invention to provide an apparatus and method for controlling tree pests that are cost effective.

It is a further object of the present invention to provide an apparatus and method for controlling tree pests that are environmentally safe.

Accordingly, the present invention is a barrier device that a pest restrictively encounters in its effort to move up the trunk of a tree. The barrier device contains a recess filled with a liquid or solid substance or a mixture thereof that can not be traversed by the pest without debilitating and/or fatal consequences. The filled recess of the device, as properly installed around the trunk of a tree, prevents non-flying pests from reaching the floral and fruiting areas of the tree, thus greatly reducing or eliminating economical loss or aesthetic value of the tree.

Additional objects and attendant advantages of the present invention will be set forth, in part, in the description and examples that follow, or may be learned from using or practicing the present invention. These and other objects and advantages may be realized and attained by means of the features, instrumentalities and/or combinations particularly described herein. It is to be understood that the foregoing general description and the following detailed description are only exemplary and explanatory and are not to be viewed as limiting or restricting the invention, as claimed.

BRIEF DESCRIPTION OF THE DRAWINGS

In all of the drawings, like reference numbers represent like parts.

DESCRIPTION OF PREFERRED EMBODIMENTS

All patents and literatures that may be cited in this description are incorporated herein by reference in their entirety.

The tree trunk barrier device ("barrier device") of the present invention provides a cost effective and environmentally safe means for controlling non-flying tree pests that require access to the foliage and fruiting areas of the tree. A notable example of such pests is the gypsy moth, *Lymantria dispar*. As discussed herein, the adult female is unable to fly and most of the eggs are laid on surfaces near the ground. The newly-emerged larvae, which are very small, must move up a tree trunk to feed on the foliage. Additional examples of economic pests which can only crawl to reach the upper tree areas include the Fuller rose beetle, *Asynonychus godmani*, and the Argentine ant, *Iridomyrmex humilis*. These pests are known in particular to effect citrus crops.

The barrier device is essentially a means of preventing non-flying pests from reaching the foliage and fruiting areas of a tree by routing their movement up the trunk of the tree to a circular recess filled with material that effectively prevents any further progression of the pests into the upper levels of the tree. The barrier device could be used, for aesthetic purposes such as, for example, to protect trees in parks, parkways, public building areas, campus grounds, golf courses, estates, private homes and other locations of concern. The barrier device could also be used for commercial purposes, for example, to protect trees and other plants in the agricultural industry.

Figure 1:
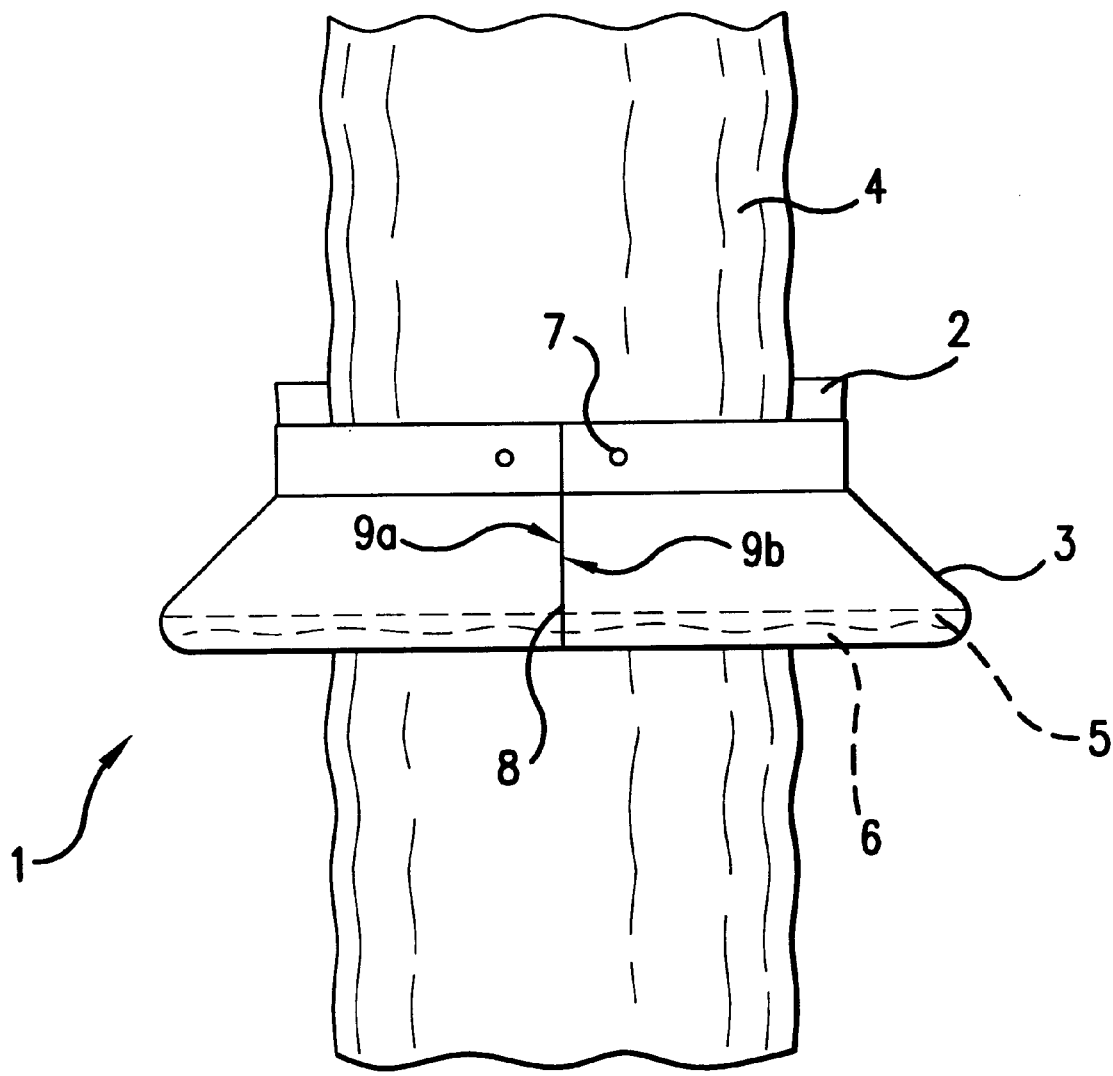
FIG. 1 is a schematic showing a front view of one example of the tree trunk barrier device of the present invention mounted to the trunk of a tree.
Figure 2:
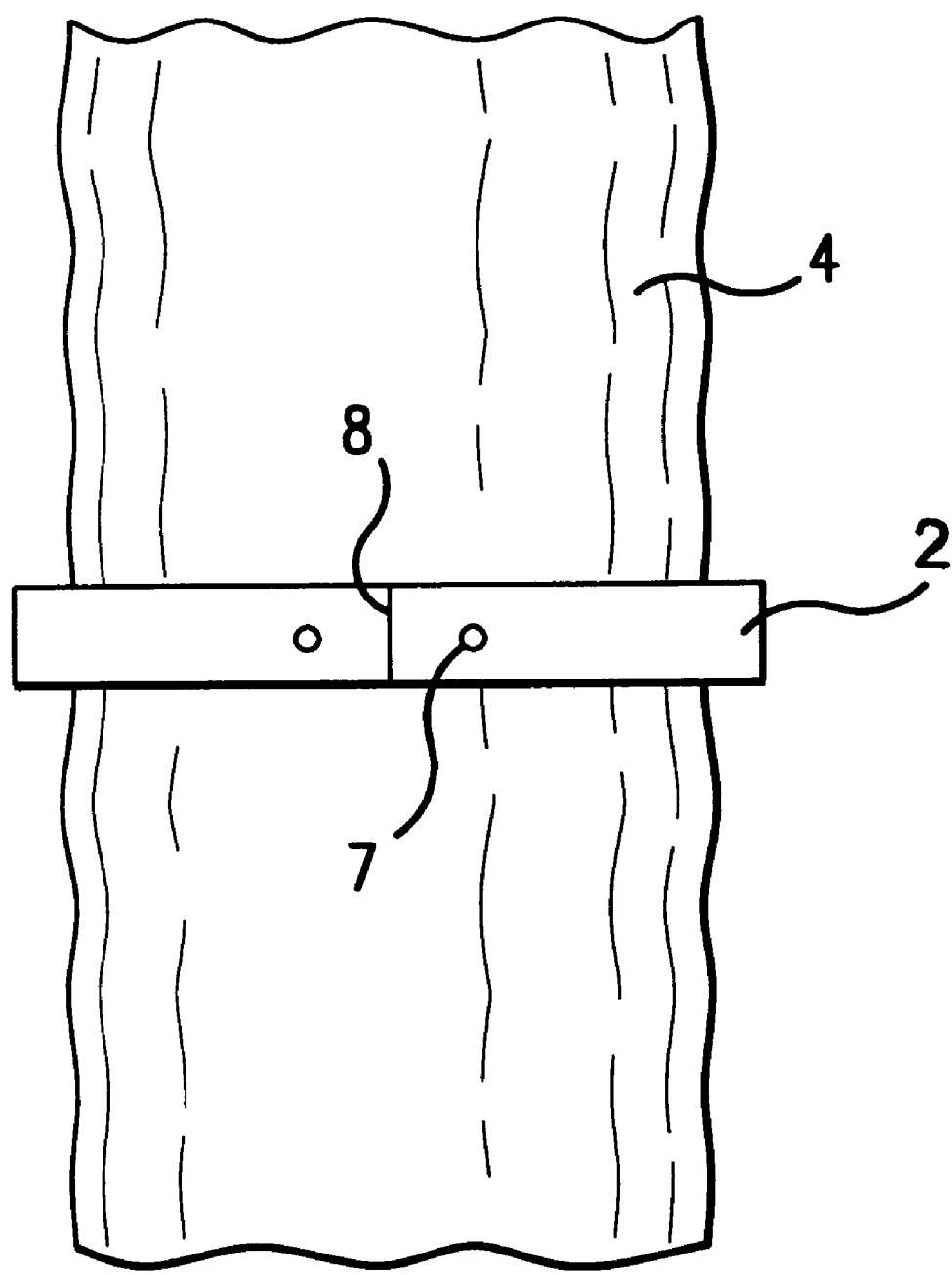
FIG. 2 is a schematic showing a front view of an example of the compressible material of the tree trunk barrier device of the present invention mounted to the trunk of a tree.
Figure 3:
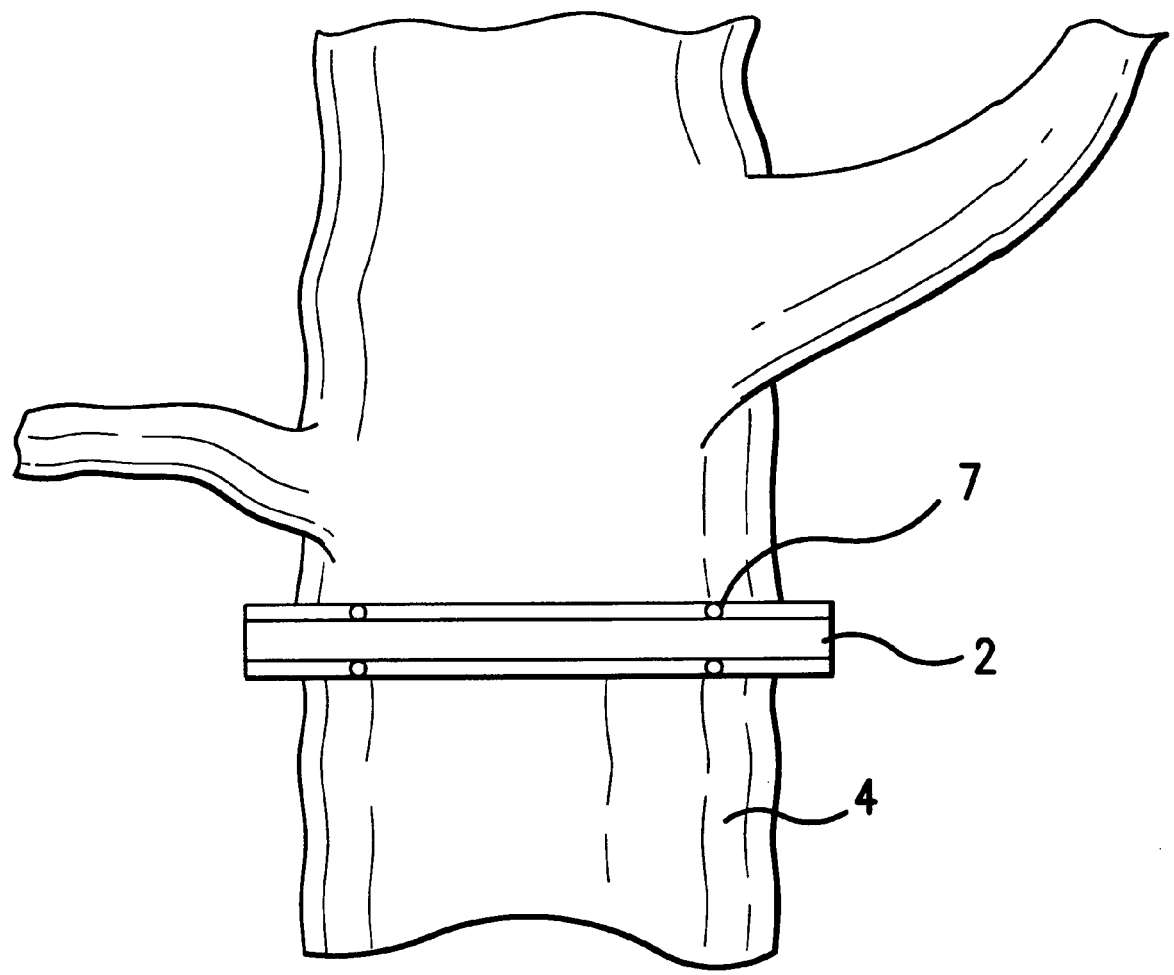
FIG. 3 is a schematic showing a front view of an example of a supporting member mounting the tree trunk barrier device of the present invention to the trunk of a tree.

The barrier device would be particularly effective in preventing the very small newly-emerged larvae of the gypsy moth, *Lymantria dispar*, from gaining access to the upper tree areas since a very high proportion of the egg masses are laid on objects close to the ground FIG. 1 shows an example of the barrier device 1 of the present invention. Referring to FIG. 1, the barrier device 1 is arranged, for example, by installing a barrier ring 3 around a band of a compressible material 2 that has previously been installed on the trunk 4 of a tree (see FIG. 2). The barrier ring 3 contains a recess 5 for holding a barrier substance 6 that prevents a pest from crawling to the foliage areas of the tree. The barrier ring 3 and the compressible material 2 are mounted on the trunk 4 by utilizing nails, screws or other supportive means 7 to securely position them around the trunk 4. The barrier 3 ring could consist of one or more pieces of a material that is sufficiently rigid to maintain the barrier substance 6 contained within the recess 5. The ends 9a and 9b of the barrier ring 3 should be closely conformed. A third trunk attachment (not shown) could then be used to ensure that the barrier ring 3 is gravitationally level to accommodate the barrier substance 6 in the recess 5. The third trunk attachment (not shown) would be particularly useful in ensuring that any liquid material that is used as the barrier substance 6 is evenly distributed within the recess 5. The third trunk attachment (not shown) should be positioned approximately 90° around the trunk 4 from the other attachments to ensure that the barrier substance 6 in the recess 5, especially in the case of liquids, is level throughout the recess 5 (see FIG. 7, which endeavors to show the effects of a misplacement of a 90° or a 270° attachment pin with reference to the sealed juncture).

Compressible material 2 that is low in cost and that is suitable for use in the barrier device 1 includes Needlepunch™ and Westfill™. A range of trunk diameters smaller than any particular casting or extrusion of a barrier ring 3 may be accommodated by ensuring that a sufficient amount of compressible material 2 is wrapped around the trunk 4. The barrier ring 3, when suitably installed, pushes against the compressible material to provide a complete seal, thus forcing any pests to encounter the barrier ring 3 in their endeavor to reach the upper tree areas. While a barrier ring 3 comprising only one piece could be used in conjunction with multiple layers of compressible material 2 to protect a range of tree trunk diameters smaller than the rigid diameter of the installed barrier device 3, it is evident that a number of different casting or extrusion sizes or configurations could be used to meet all requirements. A number of different barrier ring diameters and configurations may be provided to meet all installation requirements. Provisions thus may be incorporated for the secure mounting of the barrier device 1 on a wide range of trunk diameters with the complete elimination of any pathway for pests up the tree trunk 4 except over the surface of the recess 5.

The barrier device 1 having a barrier ring 3 comprising one piece has a precise diameter. Thus, in order to provide a suitable mounting base around the trunk 4 as a means of accommodating a limited range of trunk diameters smaller than the diameter of the barrier ring 3 and to appropriately seal off all upward progress of pests except across the filled recess 5, a suitably thick band of compressible material 2 wound around the tree trunk 4 should be used. Alternatively, an appropriate thickness of certain compressible material 2 could be prefabricated in suitable length for actual attachment to the inside surface of the upper section of the barrier ring 2. In addition, any creases, fissures or other irregularities in the trunk surface following the installation of the barrier ring 3 around the compressible material 2 could readily be closed off by the insertion of small pieces of rags or other suitable materials.

The barrier ring 3 could be made from materials ranging from paper to metallic substances. However, the use of extruded or molded plastic is preferable. The ability to seal the adjoining ends 9a and 9b of the barrier ring 3 provides the necessary rigidity of the barrier ring 3 when installed. In addition, plastic provides adequate protection against disintegration by the elements. The installation of the barrier ring 3 made from plastic or other suitable material thus could remain in service for a number of years, adding to the practicality and uniqueness of the inventive barrier device 1. Furthermore, in the use of plastics to form the barrier ring 3, there is also the option of using clear material to permit visual inspection of the recess 5 as a means of monitoring its state of effectiveness.

Figure 5:
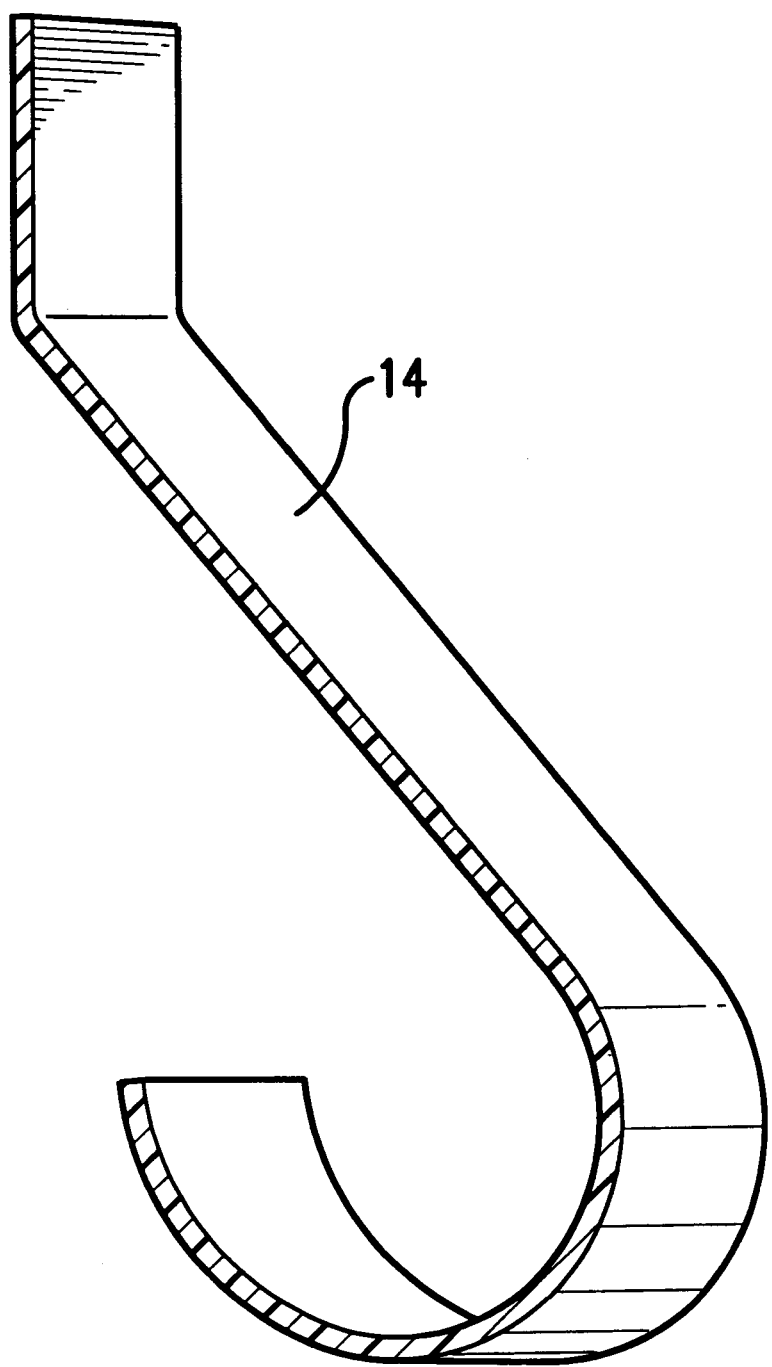
FIG. 5 is a schematic showing a sealing strip that may be used to secure the ends of the no barrier ring of the tree trunk barrier device of the present invention.

The barrier ring 3 installed around the tree trunk 4 should have the adjoining ends 9a and 9b securely sealed to enable the recess 5 to be filled with a liquid or dry barrier substance 6 without leakage or other loss and to close any possible pathways for the upper movement of pests through any unsealed junctures of the adjoining ends 9a and 9b above the recess 5. A seam 8 created by bringing the two adjoining ends 9a and 9b of the barrier ring 3 together around the trunk 4 could be sealed with available cementing preparations. Such preparations are suitable for certain plastic compositions, including polyvinyl chloride (PVC) types. For barrier ring(s) 3 fabricated from PVC or other materials, a seal may be secured by, for example, gluing a precisely molded sealant strip (not shown in FIG. 1, see FIG. 5) over the seam 13. A plastic strip 14 such as shown in FIG. 5, e.g., a small cup-like and close-fitting piece of plastic that can be securely sealed with appropriate cementing preparations over the recess area ensures an absolute seal at the juncture. Any small gaps in the upper abutting ends could then be readily sealed off with the cementing material. The ability to securely and permanently seal any of the ring end junctures is vital to the effective use of the barrier over any extended period of time and with the use of liquids in the recess must additionally prevent any leakage. The use of a closely fitting strap of the same material used to make the barrier ring and as depicted in FIG. 5 cemented in place would be a cost effective means of satisfying this requirement. It is possible that a cuplike fitting over just the moat area of the barrier ring junctures would be adequate for this purpose.

Figure 6:
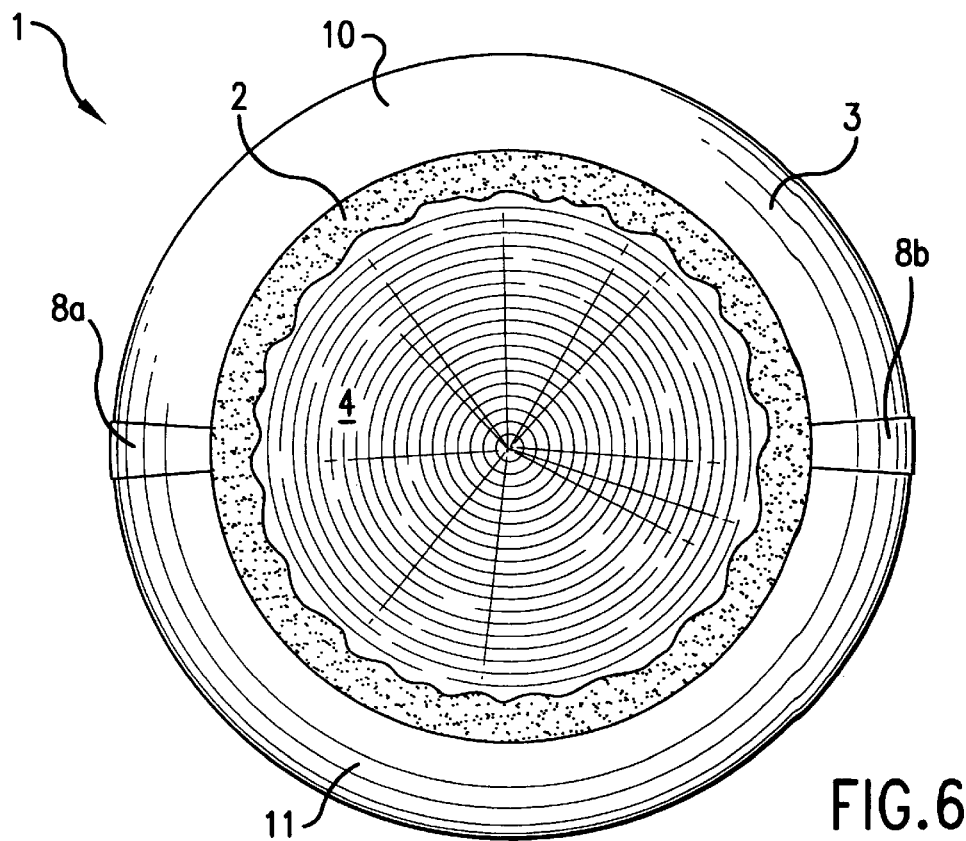
FIG. 6 is a schematic showing an example of the tree trunk barrier device of the present invention mounted to the trunk of a tree having a non-uniform trunk diameter.

FIG. 6 shows an example of the barrier device 1, wherein the barrier ring 3' comprises two pieces 10 and 11. The barrier ring 3' is similar to the barrier ring 3 comprised of only one piece. The difference being only that the two pieces 10 and 11 are sealed at two junctions 8a and 8b rather than one. Barrier ring(s) 3 of barrier device(s) 1 for trees with excessively large trunk diameters would most effectively be made in two or more sections for sealing together at adjoining ends.

Referring to FIG. 6, some trees have sufficiently deep convolutions C that may leave pathways up the trunk 4, thus providing a means for the pest to bypass the barrier device 1. The compressible material 2 is preferably of the type that can sufficiently fill the convolutions. However, if any should remain, additional pieces of the compressible material 2 or other stuffings could be inserted at the time of installation of the barrier ring 3 to block such pathways. The amount of compressible material 2 used in an installation should be adequate to allow for slow increases in the trunk's diameter while still providing a suitable seal.

Figure 4:
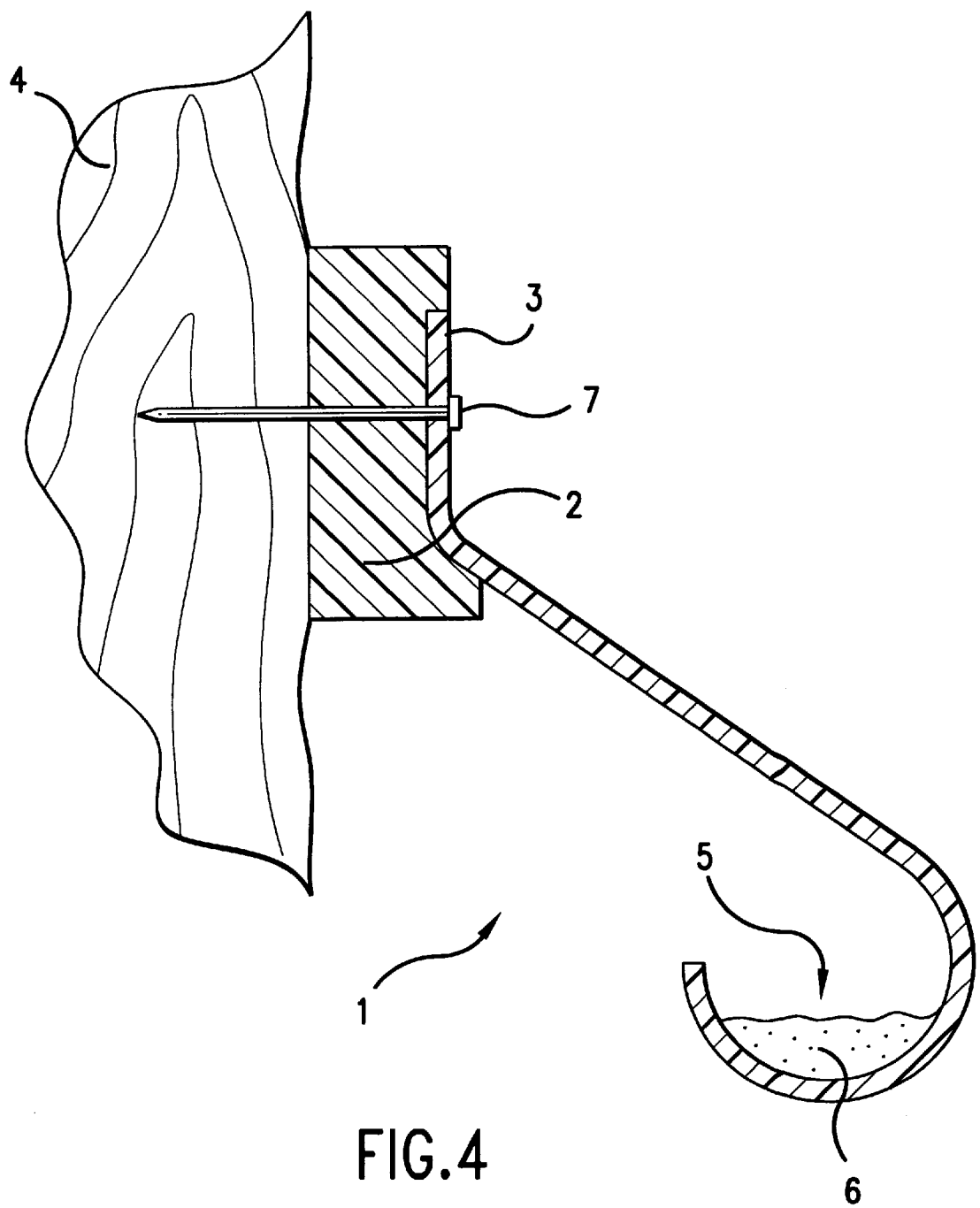
FIG. 4 is a schematic showing a cross-section view of an example of the tree trunk barrier device of the present invention mounted to the trunk of a tree.

FIG. 4 shows an example of the barrier device 1 and highlights the recess 5 thereof. Referring to FIG. 4, the configuration of the barrier device 1 provides a cover over the recess 5 so that natural sources of water or irrigation waters, or pieces of bark, leaves, twigs or other debris, will not reach the barrier substance 6 and negate its effectiveness in preventing the movement of pests across the barrier device 1.

Figure 7:
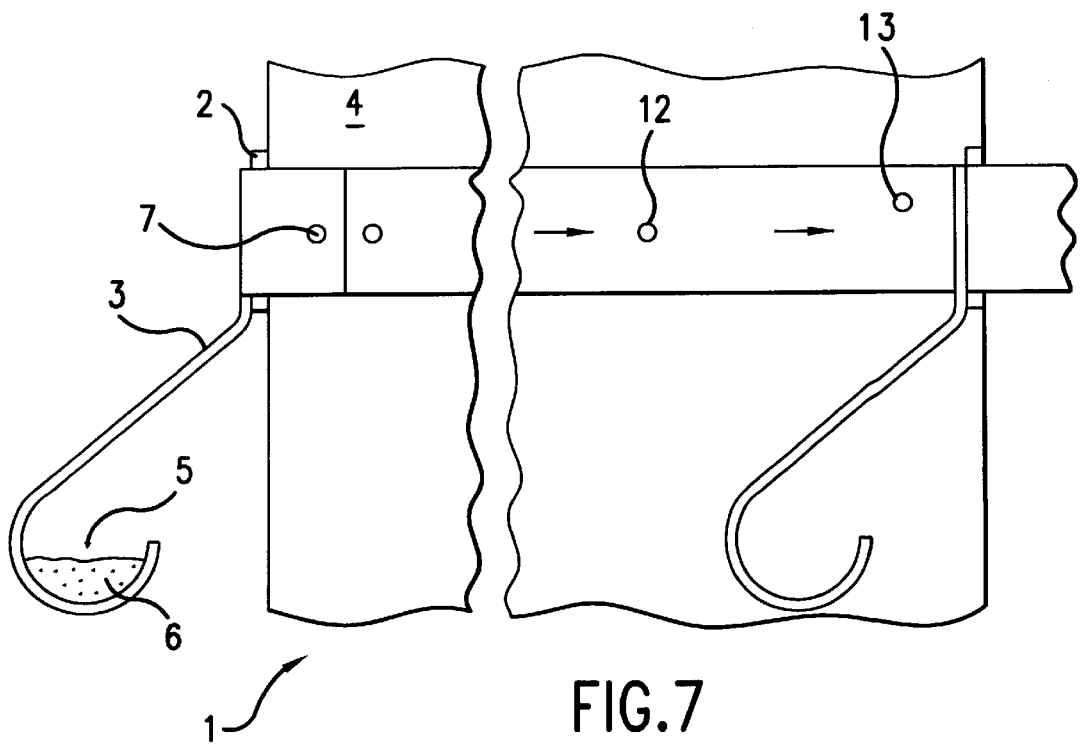
FIG. 7 is a schematic showing an example of the proper attachment of the tree trunk barrier device of the present invention to the trunk of a tree.

FIG. 7 shows the attachment of the barrier device 1 to the trunk 4 of a tree. Referring to FIG. 7, the barrier ring 3 is placed around the band of compressible material 2 and secured to the trunk 4 of the tree with a supportive means 7. FIG. 7 shows proper attachment 12 of the supportive means 7 and improper attachment 13 of the supportive means 7 at a point 90° around the tree trunk 4 from seam 8. As discussed herein, proper attachment 12 involves positioning the supportive means 7 around the trunk 4 approximately 90° from the seam 8 at a level to insure that the barrier substance 6 will be evenly distributed at all levels. Improper attachment 13 involves positioning the supportive means 7 around the trunk 4 approximately 90° from the seam 8 at such a level as to have insufficient barrier substance in some areas of the recess.

Referring to FIG. 1, FIG. 4 and FIG. 7, a liquid or solid substance 6 having the chemical and/or physical deterrent or control capabilities and having very limited or no loss by evaporation, other physical removal, or time-based elements of degradation could be used effectively in the recess 5 of the barrier device 1 to deter non-flying pests from crawling to the upper tree areas. Examples of such substance include non-evaporative liquids such as mineral oil and vegetable oil and dry substances such as certain diluent powders.

In all units it would be desirable to have an appropriate linear array of prepunched holes for the needed insertion of nails, screws or other supportive means 7. The backing of the compressible material would be an option depending on the physical nature of the compressible material.

Although many different materials can be used in the barrier device, it is preferable that the recess of the barrier device be filled with selected liquid or solid materials that would not evaporate or otherwise be rendered ineffective in functioning as a barrier preventing the movement of pest forms across the recess surface. Such material should be capable of chemically and/or physically preventing the pest of concern from successfully crossing the barrier device. It has been demonstrated that a number of GRAS materials, i.e., those that the Food and Drug Administration (FDA) has identified as materials that can be "generally regarded as safe" are wholly suitable for use in the barrier device. Such materials may be liquid or solid, and substrates in either or both conditions could be used.

The use in the barrier device of truly inert materials such as mineral oils, vegetable oils, certain diluent powders and similar stable substances which are generally considered as safe by the FDA would further limit any environmental or safety concerns related to the installation and use of the barrier device for pest control purposes. Furthermore, although the barrier device is designed to limit physical contact of children, pets or wildlife with any deleterious barrier substance, installation of the barrier device could in some situations be sufficiently high on the tree trunk to limit any such contact.

The design of the barrier device is also suited to the use of dry material within the barrier canal. Contact with such substances might impair the functionality of the target pest or more directly lead to the death of the individual. Free-flowing dust formulations would assist placement into the recess and better assure the continuity of the barrier surface. While the barrier casting could be made available with the deterrent material in place, such placement can be effected just prior to mounting the device around a tree trunk. A solid material could be introduced into the barrier channel by blocking one end while sifting the deterrent material into the device held at an appropriate angle. Any spillage or misdirection of the material could be retrieved for ultimate use. Gentle lateral shaking of a solid material prior to trunk placement facilitates the provision of a level barrier surface. The introduction of a liquid or adequately flowable deterrent substance through a single sealable port through the upper surface of one of the castings or other structure (not shown in drawings) is also possible.

The introduction of a liquid into the recess of the barrier device could readily be made through an appropriately small opening in the barrier ring directly above the recess which could then be sealed off with a cork or other closure device. A more professional and secure approach would be to use a small and suitably portable pump and nozzle arrangement to avoid any difficulty in keeping a hole in the barrier ring securely plugged. Non-liquid materials might more effectively be put in the circular recess by any expedient means immediately prior to mounting the barrier device on the tree trunk.

In the case of citrus crops, the brown garden snail, *Helix aspersa* (L.), which can cause serious damage to both fruit and foliage, has not been factored into the size and design of the barrier device, since within recent years a predatory snail known as the decollate snail, *Rumina decollata,* has been introduced into and become established in large acreages of citrus in California. The snail problem has been greatly downsized as a consequence. However, there could still be a significant snail problem in some citrus properties. In such cases, there would be the possibility that individual snails 'sealing off' temporarily on or near the installed barrier device could provide a pathway for Fuller rose beetle adults and ants into the upper tree areas, bypassing the moat area The installation of a three or four inch band of copper screening around the tree trunk below the barrier or other uses of copper as a snail repellant could be used to alleviate any such problems.

Tests have shown that a wide range of mineral and vegetable oils in the barrier device are totally effective in preventing the adult stages of the Fuller rose beetle and the Argentine ant from gaining access to the tree areas above the installed barrier device.

The present invention will be further illustrated in the following non-limiting Examples.

EXAMPLE

A laboratory simulation of the barrier device of the invention was used to determine its effectiveness for the control of adult Fuller rose beetle, *Asynonychus godmani*. In the tests with adult Fuller rose beetles, edible vegetable oils such as canola, cottonseed and soybean, a light motor oil material, and diluents such as an amorphous silica gel, a diatomaceous earth and a kaolin clay were tested. With the liquid materials a hesitancy of the beetles to enter the liquid was observed. However, those that fell in, stopped any movement very quickly and sank to the bottom without a single survival. In the tests with diluent materials, the beetles were not as readily prevented from entering the recess and in some cases emerged from the far side. However, within a day, all the exposed beetles were dead. These tests have thus unequivocally demonstrated that repeated exposure to the barrier device with as many as twenty beetles at a time to a recess filled with such barrier substances results in the entry and death of every beetle.

The adult Fuller rose beetle can cause significant foliage damage and the larvae cause root damage. Preventing the non-flying adult beetles from feeding and laying eggs in the floral and fruiting areas of the tree would help avoid foliage damage. In addition, disrupting the life cycle of this species would virtually eliminate root damage in due time.

EXAMPLE

A laboratory simulation of the barrier device of the invention was used to test the effectiveness of inert diluent materials, Aerosil 200 (Degussa Corporation, Ridgefield Park, N.J.), Celite 209 (Celite Corporation, Lompoc, Calif.) and Kaolin Type 41 Clay (Southeastern Clay Company, Aiken, S.C.). The tests showed that use of such materials in the barrier device is effective in preventing the movement of the Fuller rose beetle into the tree areas above the barrier installation.

EXAMPLE

A laboratory simulation of the barrier device of the invention was used to test the effectiveness of vegetable oil materials including canola, corn and soybean oil in preventing ants from entering upper tree areas. Positive findings ensued and such substances were subjected to field tests. Subsequent monitored field tests on citrus demonstrated that the non-flying individuals of ant colonies, which are forced to move up the trunks of trees in search of honeydew or other food sources, are prevented from such movement when the recess is filled with these substances. As anticipated, the ants avoided entry into the oil in the recess. However, inevitably as numbers present increased, some would fall into the oil. An initial effort to climb out completely covered them with oil and they promptly ceased movement and sank to the bottom. No survival was observed.

Such restriction of ant movement into the foliage and fruiting areas of trees greatly increases the effectiveness of parasites and/or predators in controlling certain pests, including aphids, mealybugs and scale insects, which can cause loss in the productivity and vitality of tree crops or create harvesting or other problems in tree areas.

The barrier device has proven effective upon installation on trees that have been skirt-pruned or otherwise only have trunk contact with the ground. With careful monitoring to insure only trunk access to the upper tree areas and the installation of the barrier device with a totally effective deterrent substance in the recess, any pest species with a restrictive dependency in its life cycle to reach the foliage and fruiting parts of the tree could experience significant reductions in future population levels, if not virtual elimination.

Any non-flying pest that must ascend a tree trunk for foliage feeding, egg laying or other purposes could effectively be denied such access by the installation of the barrier device. Compositional and/or dimensional alterations of the barrier device to prevent external influences or interventions that might jeopardize the integrity of the barrier device could be envisioned without deviating from the basic principal of a protected barrier device. Sub-barrier devices could also be used at lower positions of the trunk in the situation where the movement of snails or slugs predisposed to any lessening of the effectiveness of the barrier device in preventing insect movements into the upper tree areas.

Properly installed and adequately monitored the barrier device of the invention could remain in place and continue to provide effective control of the target pest or pests for a number of years, significantly adding to the practicality of its use.

Although the present invention has been fully described by way of examples with reference to the accompanying drawings, it is to be noted that various changes and modifications will be apparent to those skilled in the art. It is therefore intended that the foregoing detailed description be understood from the following claims, including all equivalents, which are intended to define the scope of the invention. Therefore, unless such changes and modifications depart from the scope of the invention, they should be construed as being included therein.

What is claimed is:

1. A device for deterring tree pests, comprising:
   a band of compressible material, wherein said band of compressible material is wrapped around a trunk of said tree; and
   an integral barrier ring, said integral barrier ring being made of a single part, wherein said integral barrier ring is wrapped around and completely encloses said band of compressible material, and wherein said integral barrier ring comprises a recess filled with a substance that prevents progression of said pests onto upper levels of said tree,
   wherein said band of compressible material is attached to an interior surface of said integral barrier ring, wherein said band of compressible material is of a material such that when said integral barrier ring is wrapped around said band of compressible material, said band of compressible material substantially advances into convolutions within said trunk of said tree, thereby providing a complete seal between said barrier ring and said trunk of said tree.

2. The device of claim 1, further comprising:
   at least one supporting member, wherein said at least one supporting member holds said band of compressible material onto said trunk of said tree.

3. The device of claim 2, wherein said at least one supporting member is a secure attachment device.

4. The device of claim 3, wherein said secure attachment device is selected from the group consisting of nails and screws.

5. The device of claim 1, further comprising:
   at least one supporting member, wherein said at least one supporting member holds said barrier ring onto said trunk of said tree.

6. The device of claim 5, wherein said at least one supporting member is a secure attachment device.

7. The device of claim 6, wherein said secure attachment device is selected from the group consisting of nails and screws.

8. The device of claim 1, wherein said barrier ring comprises a first end and a second end, wherein said barrier ring is wrapped around said compressible material, and wherein said first end and said second end are sealed at one junction.

9. The device of claim 1, wherein an amount of said band of compressible material used is such as to allow for slow increases in diameter of said trunk of said tree.

10. The device of claim 1, wherein said barrier ring with said band of compressible material is such as to allow for slow increases in diameter of said trunk of said tree.

11. The device of claim 1, wherein said device is capable of deterring pests for years.

12. The device of claim 1, wherein said barrier ring is made of a translucent or partially translucent material.

13. The device of claim 1, wherein said barrier ring comprises an opening for insertion of said substance.

14. The device of claim 13, wherein said barrier ring further comprises a plug for said opening.

15. The device of claim 1, wherein dry material is placed in said barrier ring prior to installation of said device onto said tree.

16. The device of claim 1, wherein said compressible material is a bonded polyester material.

17. The device of claim 1, wherein said recess is configured so as to prevent foreign materials from coming into contact with said substance.

18. The device of claim 1, wherein said substance is a non-evaporative liquid.

19. The device of claim 18, wherein said non-evaporative liquid is selected from the group consisting of mineral oil and vegetable oil.

20. The device of claim 1, wherein said substance is a diluent powder.

21. The device of claim 20, wherein said diluent powder is amorphous silica gel.

22. The device of claim 1, wherein said tree pests are non-flying pests.

23. The device of claim 22, wherein said non-flying pests are initially selected from the group consisting of *Asynonychus godmani*, Argentine ant, *Iridomyrmex humilis*, and *Lymantria dispar*.

24. The device of claim 1, wherein said device is used on citrus to control *Asynonychus godmani* and *Iridomyrmex humilis*.

25. The device of claim 1, wherein said tree pests are selected from the group consisting of aphids, mealybugs, scale insects, snails and slugs.

26. A device for deterring tree pests, comprising:
    a band of compressible material, wherein said band of compressible material is wrapped around a trunk of said tree; and
    a barrier ring, wherein said barrier ring is wrapped around and completely encloses said band of compressible material, wherein said band of compressible material is of a material such that when said integral barrier ring is wrapped around said band of compressible material, said band of compressible material substantially advances into convolutions within said trunk of said tree, thereby providing a complete seal between said barrier ring and said trunk of said tree, and wherein said barrier ring comprises a recess filled with a substance that prevents progression of said pests onto upper levels of said tree, wherein said barrier ring comprises at least a first segment and a second segment, wherein each of said segments has a first end and a second end, wherein said first end of said first segment and said second end of said second segment are sealed at a first junction, wherein said second end of said first segment and said first end of said second segment are sealed at a second junction, wherein said first segment and said second segment combined encompass a diameter of said trunk for said tree.

27. The device of claim 26, wherein a strip is wrapped around said first end and said second end at said junctions.

28. The device of claim 26, wherein a cup-like piece of plastic is wrapped around said first end and said second end at said junctions, and wherein a sealing material is applied to said cup-like piece of plastic.

29. A rigid molded device for deterring flightless tree pests, comprising:
    a band of a compressible material, wherein said band of compressible material is wrapped around a trunk of said tree to provide a combined trunk diameter at that point larger than the minimum diameter of the molded device; and an integral barrier ring, said integral barrier ring being made of a single part with a coupler closure, wherein said integral barrier ring is wrapped around and completely encloses said band of compressible material, and wherein said integral barrier ring comprises a recess filled with a non-toxic and environmentally safe liquid substance that prevents progression of said pests onto upper levels of said tree, wherein said band of compressible material as positioned will be against an interior encircling surface of said integral barrier ring, wherein said band of compressible material is of a material such that when said barrier ring of a rigid diameter is installed around such band of compressible material, said band of compressible material is forced into trunk convolutions, injuries or other irregularities within said trunk of said tree, thereby providing a complete seal between said barrier ring and said trunk of said tree.

30. A device for deterring tree pests on particularly large trees, comprising:

a band of compressible material, wherein said band of compressible material is wrapped around a trunk of said tree; and a barrier ring, wherein said barrier ring is wrapped around and completely encloses said band of compressible material, wherein said band of compressible material is of a material such that when said integral barrier ring is wrapped around said band of compressible material, said band of compressible material substantially advances into convolutions within said trunk of said tree, thereby providing a complete seal between said barrier ring and said trunk of said tree, and wherein said barrier ring comprises a recess filled with a non-toxic and environmentally safe liquid substance that prevents progression of said pests onto upper levels of said tree, wherein said barrier ring comprises at least a first segment and a second segment, wherein each of said segments has a first end and a second end, wherein said first end of said first segment and said second end of said second segment are sealed at a first juncture wherein said second end of said first segment and said first end of said second segment are sealed at a second juncture, wherein said first segment and said second segment combined encompass a diameter of said trunk for said tree.

31. A device for deterring tree pests, comprising:

a band of compressible material, wherein said band of compressible material is wrapped around a trunk of said tree; and an integral barrier ring, said integral barrier ring being made of a single part, wherein said integral barrier ring is wrapped around and completely encloses said band of compressible material, and wherein said integral barrier ring comprises a recess filled with a substance that prevents progression of said pests onto upper levels of said tree, wherein said band of compressible material is attached to an interior surface of said integral barrier ring, wherein said band of compressible material is selected from the group consisting of Needlepunch and Westfill, wherein said Needlepunch and Westfill are a type of material such that when said integral barrier ring is wrapped around said band of compressible material, said band of compressible material substantially advances into convolutions within said trunk of said tree, thereby providing a complete seal between said barrier ring and said trunk of said tree.

32. A device for deterring tree pests, comprising:

a band of compressible material, wherein said band of compressible material is wrapped around a trunk of said tree; and an integral barrier ring, said integral barrier ring being made of a single part, wherein said integral barrier ring is wrapped around and completely encloses and pushes against said band of compressible material, and wherein said integral barrier ring comprises a recess filled with a substance that prevents progression of said pests onto upper levels of said tree, wherein said band of compressible material is attached to an interior surface of said integral barrier ring, wherein said band of compressible material is of a material such that when said integral barrier ring is wrapped around said band of compressible material, said band of compressible material substantially advances into convolutions within said trunk of said tree without requiring significant pressure, thereby providing a complete seal between said barrier ring and said trunk of said tree.

33. A device for deterring tree pests, comprising:

a band of compressible material, wherein said band of compressible material is wrapped around a trunk of said tree wherein said band of compressible material is selected from the group consisting of Needlepunch and Westfill, wherein said Needlepunch and Westfill are a type of material such that when said integral barrier ring is wrapped around said band of compressible material, said band of compressible material substantially advances into convolutions within said trunk of said tree, thereby providing a complete seal between said barrier ring and said trunk of said tree; and a barrier ring, wherein said barrier ring is wrapped around and completely encloses said band of compressible material, and wherein said barrier ring comprises a recess filled with a substance that prevents progression of said pests onto upper levels of said tree, wherein said barrier ring comprises at least a first segment and a second segment, wherein each of said segments has a first end and a second end, wherein said first end of said first segment and said second end of said second segment are sealed at a first junction, wherein said second end of said first segment and said first end of said second segment are sealed at a second junction, wherein said first segment and said second segment combined encompass a diameter of said trunk for said tree.

34. A device for deterring tree pests, comprising:

a band of compressible material, wherein said band of compressible material is wrapped around a trunk of said tree wherein said band of compressible material is of a material such that when said integral barrier ring is wrapped around said band of compressible material, said band of compressible material substantially advances into convolutions within said trunk of said tree without requiring significant pressure, thereby providing a complete seal between said barrier ring and said trunk of said tree; and a barrier ring, wherein said barrier ring is wrapped around and completely encloses and pushes against said band of compressible material, and wherein said barrier ring comprises a recess filled with a substance that prevents progression of said pests onto upper levels of said tree, wherein said barrier ring comprises at least a first segment and a second segment, wherein each of said segments has a first end and a second end, wherein said first end of said first segment and said second end of said second segment are sealed at a first junction, wherein said second end of said first segment and said first end of said second segment are sealed at a second junction, wherein said first segment and said second segment combined encompass a diameter of said trunk for said tree.

* * * * *